US010158846B2

(12) United States Patent
Curtis et al.

(10) Patent No.: US 10,158,846 B2
(45) Date of Patent: Dec. 18, 2018

(54) PSEUDO-3D FORCED PERSPECTIVE METHODS AND DEVICES

(75) Inventors: James F. Curtis, Orlando, FL (US); Shawn D. Goodwin, Orlando, FL (US); Christopher M. Riehl, Orlando, FL (US); Raymond D. Conkling, Orlando, FL (US)

(73) Assignee: TERANEX SYSTEMS, INC., Orlando, FL (US)

( * ) Notice: Subject to any disclaimer, the term of this patent is extended or adjusted under 35 U.S.C. 154(b) by 1598 days.

(21) Appl. No.: 13/076,354

(22) Filed: Mar. 30, 2011

(65) Prior Publication Data
US 2012/0140027 A1   Jun. 7, 2012

Related U.S. Application Data

(60) Provisional application No. 61/420,263, filed on Dec. 6, 2010.

(51) Int. Cl.
*H04N 13/00* (2018.01)
*H04N 13/261* (2018.01)

(52) U.S. Cl.
CPC ................................ *H04N 13/261* (2018.05)

(58) Field of Classification Search
CPC ... H04N 13/0022; H04N 13/026; H04N 13/00
See application file for complete search history.

(56) References Cited

U.S. PATENT DOCUMENTS

| | | | |
|---|---|---|---|
| 5,065,236 A * | 11/1991 | Diner | 348/54 |
| 5,959,663 A | 9/1999 | Oba et al. | |
| 6,520,647 B2 * | 2/2003 | Raskar | G03B 21/00 348/E9.027 |
| 7,245,430 B2 * | 7/2007 | Kobayashi et al. | 359/464 |
| 7,573,489 B2 | 8/2009 | Davidson et al. | |
| 2003/0128871 A1 * | 7/2003 | Naske | H04N 13/0022 382/154 |
| 2004/0136589 A1 * | 7/2004 | Breslow | 382/154 |
| 2006/0061569 A1 | 3/2006 | Yamada | |
| 2007/0279415 A1 * | 12/2007 | Sullivan et al. | 345/427 |
| 2009/0041339 A1 | 2/2009 | Yamada et al. | |
| 2009/0109281 A1 * | 4/2009 | Mashitani | G03B 35/24 348/43 |

(Continued)

OTHER PUBLICATIONS

Annex B from Digital Video Broadcasting (DVB); Implementation guidelines for the use of Video and Audio Coding in Broadcasting Applications based on the MPEG-2 Transport Stream, ETAI TS 101 154, v1.7.1 (Jun. 2005), pp. 55-60.

(Continued)

*Primary Examiner* — Zhubing Ren
(74) *Attorney, Agent, or Firm* — Squire Patton Boggs (US) LLP (57) ABSTRACT

The present invention relates to conversion of 2D media to pseudo-3D left and right image pairs. In particular, it relates to imposing forced perspective on left and right versions of a 2D image. The distorted pair of images, when displayed, will be interpreted by a viewer as a 3D image. The pseudo-3D forced perspective image pairs can be produced without depth mapping of objects in scenes and without comparing the position of objects in successive image frames.

6 Claims, 5 Drawing Sheets

(56) References Cited

U.S. PATENT DOCUMENTS

2010/0073364 A1    3/2010  Jung et al.

OTHER PUBLICATIONS

VC100 Family User Manual—Includes VC80, VC100, VC120, Published on Teranex (http://www.teranex.com), downloaded Mar. 30, 2011.
International Search Report and Wirtten Opinion, Application No. PCT/US11/63520, dated Mar. 2, 2012.
Extended European Search Report issued by the European Patent Office dated May 2, 2017 for related European Patent Application No. 11847702.5.

* cited by examiner

Forced Perspective
Accentuating Height

FIG. 3B

Left Image of Pair with
Forced Perspective and
Accentuated Height

FIG. 3C

Curved Tapers

FIG. 3D

Pin-cushioning

FIG. 3E

Anamorphic distortion

FIG. 3F

Offset – left above; right below

PSEUDO-3D FORCED PERSPECTIVE METHODS AND DEVICES

RELATED APPLICATION

This application is related to and claims the benefit of U.S. Provisional Patent Application No. 61/420,263 entitled "PSEUDO 3D FORCED PERSPECTIVE METHODS AND DEVICES," filed 6 Dec. 2010. The priority application is incorporated by reference herein.

BACKGROUND OF THE INVENTION

The present invention relates to conversion of 2D media to pseudo-3D left and right image pairs. In particular, it relates to imposing forced perspective on left and right versions of a 2D image. The distorted pair of images, when displayed, will be interpreted by eyes and minds as a 3D image. The pseudo-3D forced perspective image pairs can be produced without depth mapping of objects in scenes and without comparing the position of objects in successive image frames.

About a year ago, the film Avatar set off popular enthusiasm for three-dimensional (3D) movies, breaking prior records for ticket sales. Since then, additional feature films have been successfully released in 3D. Theaters have added 3D projectors. Television manufacturers have added capabilities to play back 3D stereographic DVDs and even to automatically convert 2D media for 3D viewing, using active shutter glasses to control left and right eye views. A pocket size 3D camera with two lenses and adjustable parallax is now available, accompanied by an accessory lenticular viewing screen. In other words, 3D stereographic media has arrived.

Countervailing the enthusiasm for 3D media is the difficulty of converting 2D media for 3D viewing, which involves calculating a depth mask that represents the distance from the viewer to various objects in a scene. Creating 3D stereographic image pairs applies parallax calculations to parts of a scene, based on the depth map.

Televisions that convert 2D content for 3D display make mistakes in dynamic depth mapping, which are visible on the screen when an object that pops from the background to the foreground. An object pops forward (or backwards) when the depth map algorithm reclassifies the distance to that object. For instance, when the object moves and obscures part of the scene that had previously been classified as closer to the viewer than to the object. The depth map algorithm reclassifies the moving object and it pops forward. Popping artifacts range from amusing to annoying.

Accordingly, an opportunity arises to introduce automated and computer-assisted methods and systems that convert 2D media to 3D image pairs. Depending on the cost and amount of user intervention required, improved systems may be used by broadcasters or other suppliers to prepare 3D media or may be incorporated directly into TVs and other consumer products. Better 3D reproduction may follow.

SUMMARY OF THE INVENTION

The present invention relates to conversion of 2D media to pseudo-3D left and right image pairs. In particular, it relates to imposing forced perspective on left and right versions of a 2D image. The distorted pair of images, when displayed, will be interpreted by a viewer as a 3D image. The pseudo-3D forced perspective image pairs can be produced without depth mapping of objects in scenes and without comparing the position of objects in successive image frames. Particular aspects of the present invention are described in the claims, specification and drawings.

BRIEF DESCRIPTION OF THE DRAWINGS

FIGS. 3A-E illustrate variations on and transformations that may be combined with the forced perspective.

FIGS. 5-7 depict applications of the technology disclosed.

DETAILED DESCRIPTION

The key to 2D-to-3D conversion has long been a good depth map. Over decades, researchers have posed new and improved ways of constructing depth maps. Patent applications US 2010/0165081 (pub. Jul. 1, 2010) and US 2010/0118127 (pub. May 13, 2010) illustrate a variety of ways to separate foreground objects from background content, in order to prepare the depth map.

As of 2010, major consumer electronics manufacturers had developed and launched televisions with chipsets that automatically build depth maps, for unassisted, on the fly 2D-to-3D conversion. Buyers wear active shutter glasses to watch converted images. The glasses timeshare the display between left and right eye stereographic images.

Applicants were aware of depth mapping, but was not a researcher committed to building upon the conventional approach. Applicants took a completely different approach, one that frees the conversion processor from any need to calculate a depth map and, instead, relies on human vision and brains to extract depth information from a pair of distorted images.

Figure 8:
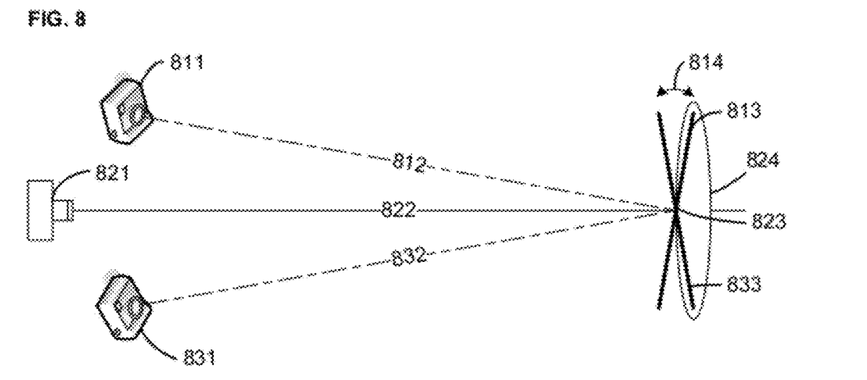
FIG. 8 illustrates the perspective of two cameras separated by a distance.

The stroke of genius came as Applicants were working with a pair of cameras to generate stereographic images, as illustrated in FIG. 8 of this application. Applicants realized, as they were using the cameras to mimic human vision, that they might mimic the cameras' views by distorting left and right versions of a single 2D image to match the perspectives of the two cameras.

FIG. 8 illustrates the perspective of two cameras separated by a distance. In a stereographic camera setup, the distance between the left and right lenses is typically between 65 and 75 cm, similar to the spacing of human eyes. In a projective sense, each lens or eye sees a planar view of the object. Part of the difference between the two views amounts to a rotation of the two planes planar views of the object. Of course, another part of the difference is how a foreground object appears against the background, as viewed from the different positions. Distorting left and right versions of a single 2D image cannot mimic the foreground object difference between views.

In FIG. 8, the upper (left) 811 and the lower (right) 831 cameras view the object 824 along respective viewing axes 812, 832. The cameras record images that can be thought of as projections of the object 824 onto viewing planes 813, 833, which are perpendicular to the respective viewing axes. Of course, this is a simplification, as it ignores how a foreground object appears shifted against the background when viewed from different positions, which is part of the reason for conventionally applying depth maps and complex transformations.

Undeterred by conventional teaching, Applicants experimented with producing left and right distorted images from a single 2D image recorded by a camera 821 positioned along a central axis 822. Applicants produced a distorted pair of left images and created a pseudo-3D stereographic view with forced perspective. It is pseudo-3D, because no depth mapping information is used to separate foreground objects from background objects. It imposes a forced perspective on the 2D image in the sense that head-on view of a rectangle is distorted to appear as if the viewing points are moved off-center, to the left and right.

As Applicants refined this distortion technique, they discovered that pleasing forced perspective transformation angles significantly exceeded the angular difference 814 between the viewing planes 813 and 833. For instance, at 10 feet, a camera separation of three inches translates into an angular difference of less than two degrees. When the provisional application was filed, it was believed that a forced perspective distortion that was believed to correspond to a viewing angle difference 814 of 6.5 to 8 degrees seemed subjectively more pleasing for a variety of scenes. Upon further investigation of the warping hardware used, it turned out the viewing angle difference 814 selected as subjectively pleasing was actually 2.98 to 4.98 degrees.

With this introduction in mind, we turn to the accompanying figures.

Figure 1:
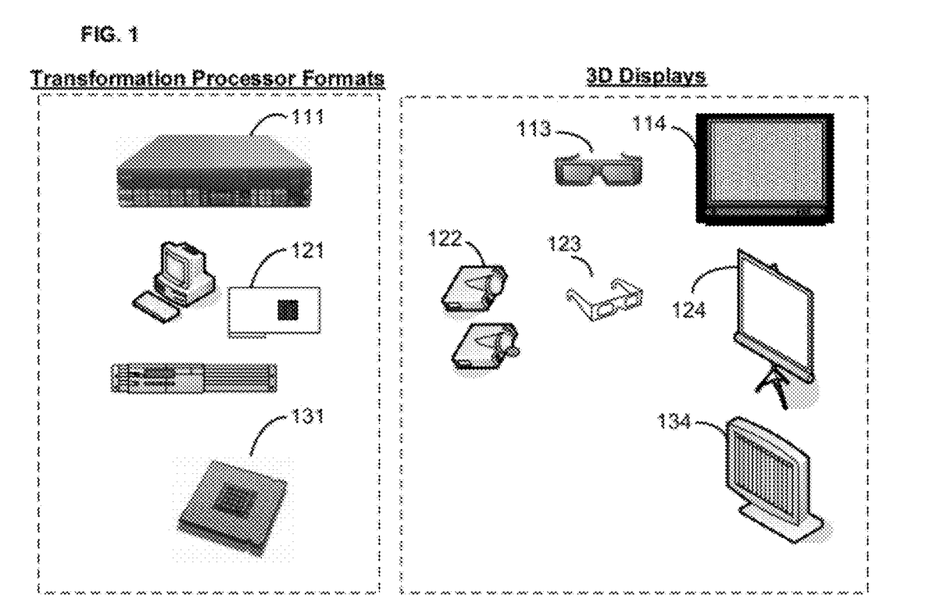
FIG. 1 depicts 3D displays and transformation processor formats.

FIG. 1 depicts 3D displays and transformation processor formats. Three typical displays for stereographic images are a television, a projection screen and a lenticular panel. At the time of this disclosure, televisions 114 with 3D display capabilities typically are viewed through active shutter glasses 113. The active shutter glasses alternately give the left and right eyes of a view of the television screen, synchronized to when the television displays left and right eye images. Greatly increased refresh rates, on the order of 120 or 240 Hz instead of 30 or 60 Hz, allow the television to display separate images for the left and right eyes.

Projection screens 124 are used in theaters. Two or more projectors 122 project images for left and right eyes onto the screen simultaneously, with either different polarization states or different color phases. An inexpensive pair of viewing glasses 123 has different lenses for the left and right eyes. Some of the lens pairs are horizontal and vertical polarizers, clockwise and counterclockwise polarizers, green and red lenses, or blue and magenta lenses.

A lenticular screen 134 passes separate images to left and right eyes without any need for glasses. Explanation of the mechanics of a lenticular screen is beyond the scope of this disclosure.

These types of 3D displays reproduce image pairs. We disclose producing distorted image pairs using a variety of hardware platforms. A dedicated processor 111, such as the VC100 by Teranex, can be used. This device, is further illustrated in the block diagram of FIG. 4, uses a pair of processors with single instruction multiple data (SIMD) capabilities to produce a pair of distorted images in parallel. A single processor could be fast enough to handle left and right image distortion serially. A dedicated processor 111 could alternatively be an FPGA or a program running on a processor produced in volume, such as a CPU, GPU or a digital signal processor (DSP).

Alternatively, an add-in card, such as a graphics card, could hold hardware appropriate to produce distorted image pairs. Graphics cards typically use a graphics processing unit (GPU). More generally, an add-in card could use an FPGA, GPU, CPU or DSP. The CPU could be an ASIC or RISC design. A processor alternatively could be built into a chip for surface mounting or other packaging in a transformation processor. The processor could be a separate chip or a block within a larger chip. In this sense, a processor refers to a wide range of electronic calculating devices running firmware or software that specifically implements the technology disclosed.

Figure 2:
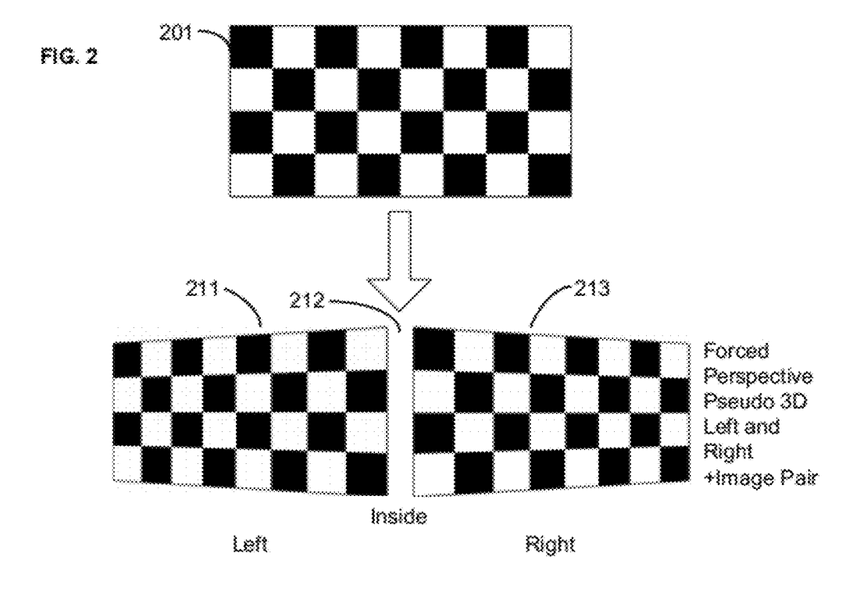
FIG. 2 illustrates transforming a 2D image into a forced perspective pseudo-3D image pair.

FIG. 2 illustrates transforming a 2D image 201 into a forced perspective pseudo-3D image pair 211, 213. We have labeled the right side of the left image and the left side of the right image as the "inside" 212, which is opposite of the outside of each image. In the figure, the vertical inside edge 212 is taller than the vertical outside edge of each image in the pair. In this figure, the taper at the top and bottom of the image is symmetrical. The tapers of the left and right images are complementary. By complementary, we mean that similar tapers from the inside to the outside edge are applied to the left and right images. The resulting images have profiles that are symmetrical about the inside edge.

Upon further refinement, a negative viewing angle difference appears to be more pleasing for some scenes. In such scenes, the inside edge is shorter than the outside edge, essential swapping the right and left image pairs 211, 213. A so-called negative viewing angle difference creates an effect of some parts of an image appearing to be in space closer to the viewer than the surface of the screen. Conversely, a positive viewing angle difference causes some parts of the image to appear to be more distant from the user than the screen, which is pleasing for distant images, such as telescopic viewing of big wave surfing, where it is implausible that anything would be closer to the viewer than the screen distance. A sword fight, through the eyes of one of the combatants, would be better viewed with the occasional blade sweeping out of the screen and causing the audience to flinch.

Figure 3A:
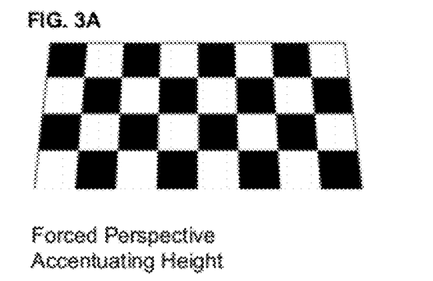
Figure 3B:
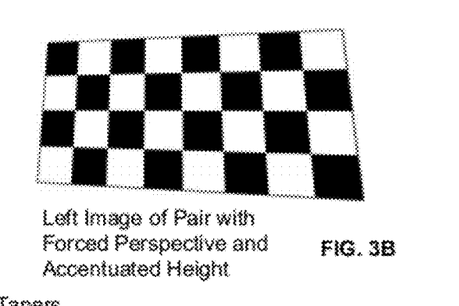

FIGS. 3A-E illustrate variations on and transformations that may be combined with the forced perspective in FIG. 2. In FIG. 3A, a vertical taper is applied to create a forced perspective that accentuates height. In FIG. 3B, the forced perspective to accentuate height is applied with a left pseudo-3D image.

The linear algebra that transforms an image 201 as illustrated is sometimes referred to as a "projective transform." An article entitled "Affine transformations (and cousins)" found on the Leptonica website, which is hereby incorporated by reference, nicely describes the projective transform. More a part of common vocabulary, a distortion or warping that is useful for producing forced perspective pseudo-3D image pairs is the so-called "keystone correction," which is used to align a projected image to the corners of a projection screen. See, e.g., U.S. Pat. No. 6,520,647, which is incorporated by reference. For our purposes, keystone correction is reversed, to impose forced perspective on the original pattern, rather than conforming a projection to a rectangular viewing screen.

Without applying matrix transformations or linear algebra, a general distortion matrix can be used to transform an image 201 into a pseudo-3D image pair 211, 213. The general distortion matrix approach is explained and depicted in U.S. Pat. Nos. 7,384,158 and 7,126,616, which are incorporated by reference.

There may be specific content, specific scenery that calls for having the center of the image recede into the distance and to be further from the viewer than the screen, instead of appearing close to the viewer. The bore of a tunnel, pipe or well may seem more realistic or ominous if the center the image dramatically recedes from the viewer. An inside edge that is longer than the outside edge of a forced perspective pseudo-3D image pair may cause the end of the bore to seem further away than the screen.

While one embodiment of this technology applies forced perspective with an inside edge that is taller than the outside edge of the pseudo-3D image pair, this disclosure extends to forced perspective pairs that have an inside edge that is shorter than the outside edge and generally to selecting appropriate distortion parameters to match the desired projection on a scene-by-scene or program-by-program basis.

Figure 3C:
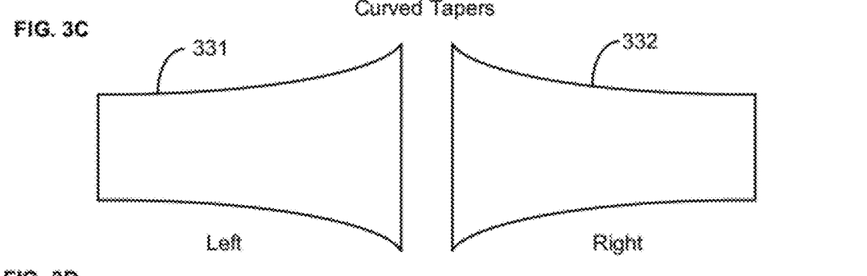
FIG. 3C illustrates curved tapers instead of the trapezoidal projections.

FIG. 3C illustrates curved tapers 331, 332 instead of the trapezoidal projections of 211, 213. In the figure, the tapers are concave with respect to the center of the image. Alternatively, the tapers could be convex, bulging away from the center of the image. The curve could be defined by a catenary function, a parabola or, more generally, a polynomial as described in the '158 and '616 patents identified above. One use for tapered curves would be to change the apparent focal length of the lens used to create the image, as sometimes is applied to reshape an image captured with a fish-eye lens.

In FIG. 3C, as in FIG. 2, the top and bottom tapers are illustrated as being symmetrical about a horizontal axis. There may be situations, such as when the viewpoint is at the bottom of the image and the entire scene is above eye level, in which the top taper would be tapered at a greater angle than the bottom taper. Another corner case would be when the viewer to the right or left of a building façade or other planar object. From off-center, a non-symmetrical polygon might describe the desired projection of the original image 201 corners. C.f., U.S. Pat. No. 6,520,647 (apparent viewing angles). When we consult FIG. 8, it appears that an eye level at the bottom of the scene might better be accommodated by a combination of horizontal and vertical tapers or keystoning, as depicted in FIG. 3A.

Figure 3D:
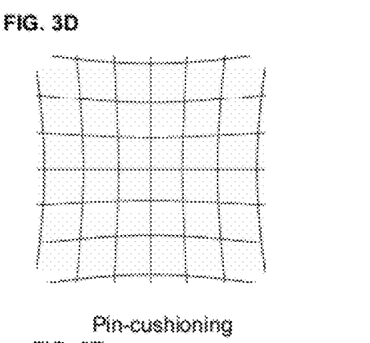
Figure 3E:
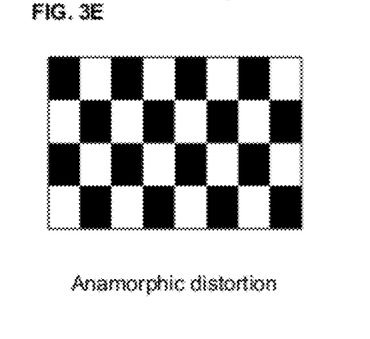

FIGS. 3D and 3E depict other distortions that might be combined with forced perspective. FIG. 3D illustrates pin cushioning. The opposite of pin cushioning is barrelling, in which parallel lines bulging away from the center of the image. FIG. 3E depicts anamorphic distortion; for instance, squeezing a 16:9 image horizontally for display on a 4:3 screen. These additional distortions can be added in virtually any combination to the forced perspective transformation of a 2D image.

Figure 3F:
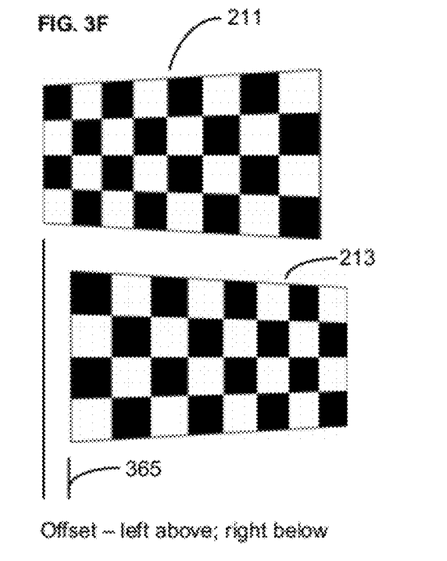
FIG. 3F illustrates a further offset transformation that can be applied to enhance the sensation of depth.

FIG. 3F illustrates a further transformation that can be applied to enhance the sensation of depth. In this figure, the left and right pseudo-3D image pairs 211, 213 are spread apart by an offset distance 365. That is, the center of the left image 211 is shifted to the right and the center of the right image 213 is shifted to the left. In practice, a shift of 10 to 20 pixels for a 1080 HD image that is 1920 pixels wide has seemed satisfactory. In addition to the default of no shift, we disclose combining with forced perspective a shift that moves the left and right images apart by between one-half and one percent or between one-half and two percent of the image width to enhance the sensation of depth.

The reader should understand that the images ultimately displayed will typically be matched to a rectangular frame by cropping or overscan. A zoom function can be applied to appropriately size the distorted image for the desired frame size, such as the frame size that held the original image or to an anamorphically distorted version of the original image frame.

Figure 4:
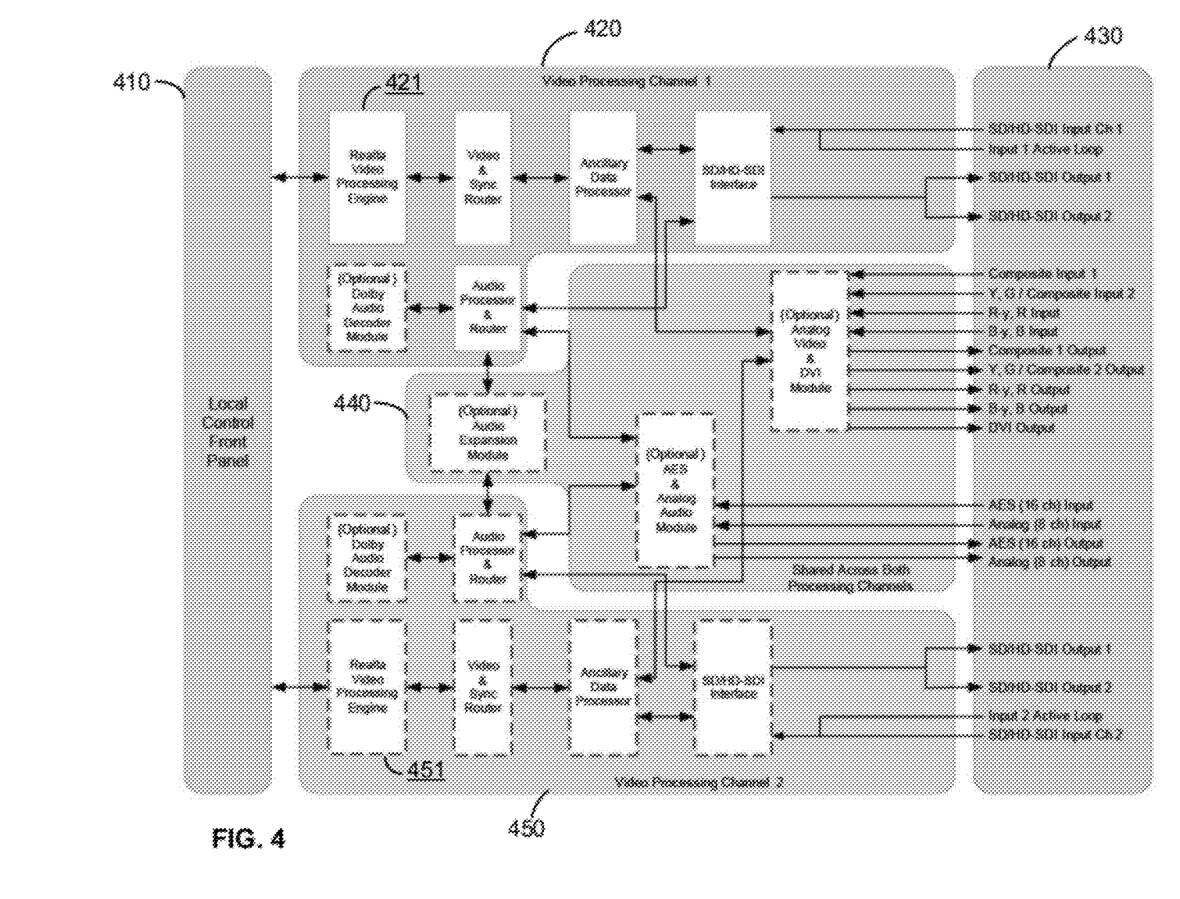
FIG. 4 is a block diagram of the VC100.

FIG. 4 is a block diagram of the VC100. The control panel 410 may be attached to the device either locally or coupled remotely. Two video processing channels 420, 450 can process an input image to simultaneously produce two distorted output images. The video processing channel of this embodiment relies on a video processing engine 421, 451 to distort an input image 201. This device coincidentally handles audio 440 and a wide variety of conversion formats. Standard with this device are over 100 format conversion options. Over 300 format options are available in total, as identified on the Teranex website. The Nov. 15, 2010 and Jan. 28, 2011 versions of the VC100 family user manual, published by Teranex on its website, is hereby incorporated by reference.

FIGS. 5-7 and FIG. 9 depict applications of the technology disclosed. The series of actions depicted in FIG. 5 include receiving 512 an image (201) and duplicating 522 the image (201L, 201R). Creating duplicate copies the image is optional, as memory types are available that would allow two processors to simultaneously access a single memory location holding the original 2D image (201). The next action is preparing 532 a pseudo-3D image pair with forced perspective (211, 212). Optionally, transformation parameters can be received from an external source—FIG. 7 below depicts preparing parameters that might be received 512 along with the 2D images (201). As described above, a pair of distorted images can be prepared in parallel or sequentially. Optionally, other transformations, including one or more vertical keystone correction, pin cushioning, barreling, anamorphic distortion and offset can be combined with distorting the image (201) to impose forced perspective. A pseudo-3D forced perspective image pair can be fed in parallel or sequentially to a variety of media consumers and storage apparatuses. Image pairs might be immediately used by a projection system 523, a lenticular display 533 or a television (not shown). Image pairs might be stored for later use. In current systems, creating the image pair would be followed by encoding 552 prior to transmission 553, whether the transmission was over the air, via satellite, by cable, via the Internet or some hybrid local delivery system. The encoding step might immediately follow applying transformations or it might be applied to stored images from a media archive 543. Encoded images might be consumed immediately or stored for later distribution. A variety of encoded image sizes might be generated at the same time, consistent with the emerging HTTP Adaptive Streaming formats used for IPTV, Internet distribution and consumer devices having different screen sizes.

Figure 6:
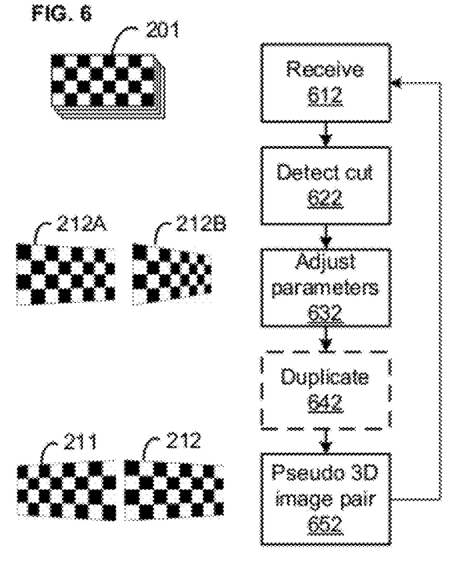
FIG. 6 depicts a workflow in which distortion parameters are adjusted in accordance with the scenery.

FIG. 6 depicts a workflow in which distortion parameters are adjusted in accordance with the scenery. This workflow would involve receiving 612 a series of images (201). A cut detector would be applied to detect cuts 622 between segments of the incoming images. For instance, a standard cut detector would sense the point at which the director goes from a shot of the entire room to a close-up on one actor. The next action would be to adjust the parameters 632 for the segment between cuts, so that the distortion parameters are appropriate. The parameters include at least the degree of forced perspective. The degree of forced perspective relative to the horizontal axis might be expressed by a single parameter.

At the time the provisional application was filed, a so-called intensity parameter scaled from −4 to +4 was believed to correspond to a transformation angle of 0 to about 14 degrees. This so-called transformation angle measurement corresponds to a relative rotation angle 814 of the image plane that produces the taper resulting from a keystone transformation. Preferably, the transformation angle (201 vs. 211, 213) is in the range of about 1.7 to 12.2 degrees. More preferably, the transformation angle is in the range of 3.4 to 10.4 degrees. Most preferably, the transformation angle is 5.2 to 8.7 degrees. However, the provisional application also indicated that applicant was investigating further the scaling of these values, as the processor's handling of angle parameters was not clearly documented. Further investigation led to the conclusion that the transformation angles resulting from the −4 to +4 intensity parameter range corresponded to 0 to 7.96 degrees. Accordingly, the preferred transformation angle would be rescaled by about 8/14. With rescaling, the transformation angle (201 vs. 211, 213) may be in the range of about 1.0 to 7.0 degrees. More preferably, the transformation angle is in the range of 1.9 to 5.9 degrees. Most preferably, the transformation angle is 3.0 to 5.0 degrees.

In work subsequent to filing of the provisional application, the intensity range was revised to −40 to +40. At 0 intensity, there would be no warping. At −40, the transformation angle is 8 degrees, with the inside edges being shorter than the outside edges of the transformed image pair. At +40, the transformation angle also is 8 degrees, but with the inside edges being longer than the outside edges. In some scenes, a negative transformation angle is more pleasing. When a negative transformation or viewing difference angle is used, it tends to be less than for a positive transformation. A preferred negative transformation angle is in the range of −1.0 to −3.0 degrees. More preferably, the transformation angle is in the range of −1.5 to −2.5 degrees.

These ranges of transformation will be further refined with experience and viewing by large audiences.

After rescaling, it seems that the most pleasing forced perspective may exaggerate the apparent rotation modestly, up to 3× the rotation angle 814.

The desirability of these alternative ranges of transformation is subjective and has been selected by the inventor in consultation with colleagues after dozens, but not thousands of hours of viewing. These ranges correspond to a normal scene that places the focus of attention near the center of the frame and closer to the viewer than the background. For this normal scene scenario, the transformation angle is greater than would be measured or calculated from for angle 814 in FIG. 8. Other ranges of transformation angle may be preferable for various scene types.

More generally, transformation parameters might be expressed as four corners of a polygon produced from the original image, as eight parameters of a projective transform (Leptonica) or as nine parameters of a general transform (U.S. Pat. No. 6,520,647) that map a 2D image 201 to a forced perspective image (211, 213). It should only be necessary to specify parameters required to produce one distorted image (left or right) of a complementary forced perspective image pair, due to the symmetry of the image pair across the inside edge.

Optionally, an offset parameter 365 also could be generated. The offset parameter might range from 0.5 percent to 1.5 percent when offset is applied and set to zero in some cases of relatively little 3D perception, such as scenes in the distance.

Additional distortion parameters could further be specified.

In some embodiments, the cut detector might be eliminated and a single set of parameters assigned to an entire set of 2D images 201.

Figure 7:
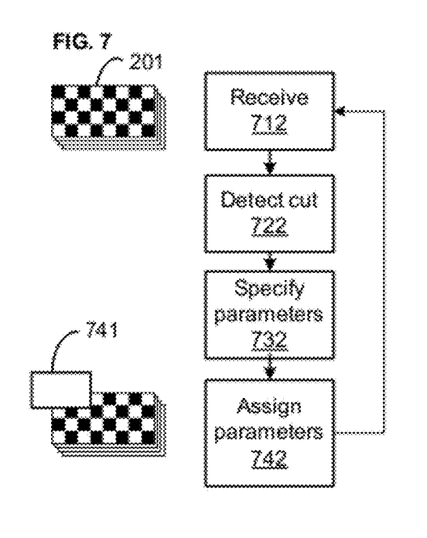
FIG. 7 depicts calculating and storing the distortion parameters for later transmission.

A difference between FIGS. 6-7 involves whether the parameters are acted upon immediately or stored for latter use. In FIG. 6, the optional duplicate and following actions 642, 652 correspond to the actions described for FIG. 5, actions 532, 542, 552. In FIG. 7, there is utility to calculating and storing the parameters for later transmission.

The current MPEG-2 transmission stream model for Automatic Format Detection (AFD) serves as a model for embedding distortion parameters in stream control information of a media stream. The AFD protocol is described in Annex B of ETSI TS 101 154 V1.7.1 (2005-06), a document entitled "Digital Video Broadcasting (DVB); Implementation guidelines for the use of Video and Audio Coding in Broadcasting Applications based on the MPEG-2 Transport Stream." Annex B describes coding for "use in networks that deliver mixed formats to a heterogeneous receiver population." The coding assists receivers in optimizing presentation of video by describing the nature of the content transmitted. The coding is carried in user data of the video elementary stream of an MPEG-2 transport stream.

In general, 3D transformation data can be included in a transmission stream with image or video data. The 3D transmission data includes at least degree of forced perspective data. It optionally includes image offset data. It can be included as transformation angle parameters or more generally as polygon-to-polygon transformation parameters, either corner-to-corner transformation mappings or as linear transform matrix coefficients. The 3D transformation data may change with cuts in the image sequence. The 3D transformation data may be included in stream control information or in image headers, such as of keyframes.

Figure 9:
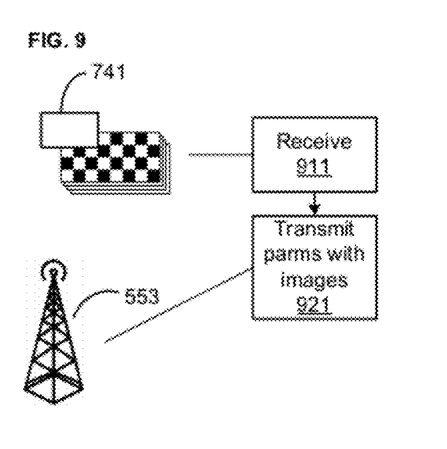
FIG. 9 depicts transmitting an image stream with transformation parameter data that functionally determines how pseudo-3D image pairs will be composed from 2D images by a receiver.

FIG. 9 depicts transmitting an image stream 921 with transformation parameter data 741 that functionally determines how pseudo-3D image pairs will be composed by a receiver from 2D images. Any or all of the transmission parameter data identified above can be transmitted 921 with the image stream. The function of the transformation parameter data is different from the image or audio content of the media stream, as the transformation parameter data functionally determines how the payload image data will be distorted by the receiving device before it is displayed. One component 911 buffers images and parameters, which can involve retrieval from storage or redistribution of content as it is received from a network. The next component 921 transmits them. Transmission can be via any of the transmission media described above. Transmission can be scheduled or on demand.

Figure 10:
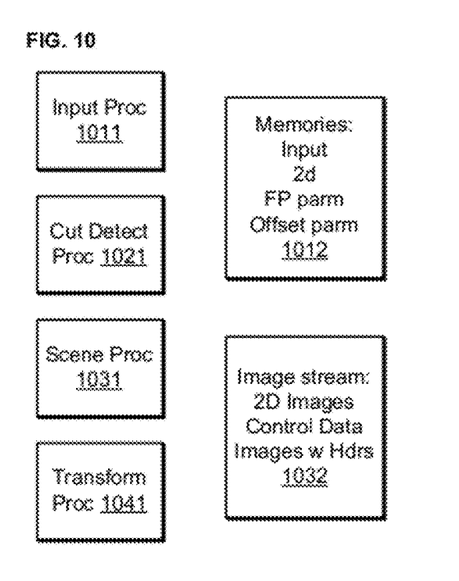
FIG. 10 is a high level block diagram of processor and memory blocks that are combined in various ways to build some of the devices disclosed herein.

FIG. 10 depicts in a block diagram processor and memory blocks that are combined in various ways to build some of the devices disclosed herein. The input processor 1011 or an input/output port (not illustrated) provides access to external data and to users. The cut detection processor 1021 locates cuts between scenes in a stream of 2D images. The scene processor 1031 automatically or semi-automatically determines parameters for transformation of 2D images into pseudo-3D image pairs. The transformation processor 1041 and logic running on the transformation processor transforms 2D images that represent physical scenes using a specially programmed processor to apply at least complementary tapers and to generate left and right forced perspective image pairs. The memories 1012 support operation of the processors. It should be understood that these processors and memories, in some embodiments, may be combined into a single chip or run on a single FPGA or on fewer discrete devices than indicated by the number of blocks in the figure. The image stream 1032 represents 2D input image(s) and parameters embedded in an image stream. The parameters may be embedded as image stream control data or embedded in image headers of at least some image frames of the image stream.

Figure 11:
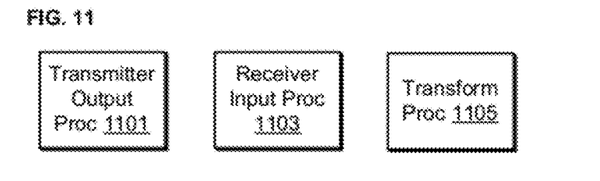
FIG. 11 is a high level block diagram of the transmitter/receiver pair that send and receive image streams with parameters embedded in the image stream.

FIG. 11 depicts, in a block diagram, the transmitter/receiver pair that send and receive image streams with parameters embedded. The transmitter output processor 1101 sends the image stream and parameters via a communications channel. Details of the channel are beyond the scope of this disclosure. The communications typically will be packetized and electronic. It may be wired or wireless, synchronous or asynchronous, pure or hybrid. The receiver input processor 1103 receives what the transmitter sends and passes it to the transformation processor 1103 (which corresponds to 1041) to transform 2D images that represent physical scenes using a specially programmed processor to apply at least complementary tapers and to generate left and right forced perspective image pairs.

Figure 12:
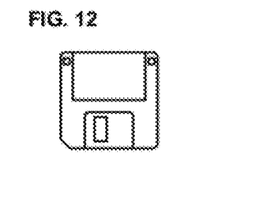
FIG. 12 depicts one type of non-transitory memory that could be used as an article of manufacture.

FIG. 12 depicts one type of non-transitory memory that could be used as an article of manufacture, albeit an antique type. More likely, an article of manufacture would be a CD, DVD or solid state memory. It also could be a dynamic memory or non-volatile (rotating or solid state memory) produced by downloading program instructions onto a local computer.

Some Particular Embodiments

The technology disclosed can be practiced as a method, device or article of manufacture. The technology disclosed uses computers to interpret 2D images, accept specified parameter values or determine transformation parameters, to transform digital data representing a picture of a physical object, to create pseudo-3D image pairs with forced perspective, to transmit and receive digital data streams that include transformation parameters that display the pseudo-3D image pairs stereographically. In this sense, we use the term computers generally to include a variety of computing platforms and processor styles. The key characteristic is that computing resources are programmed to the specific purposes disclosed.

The manipulation of digital images and handling of digital data streams requires use of machines. One part of this disclosure that calls for human interaction with the computer describes a feature that generates recommended transformation parameters for the specific scenes, transmits the recommendations for review by a user, and receives a parameter selection message in return. Other than that, the transformations described generally run on machines without user intervention.

Figure 5:
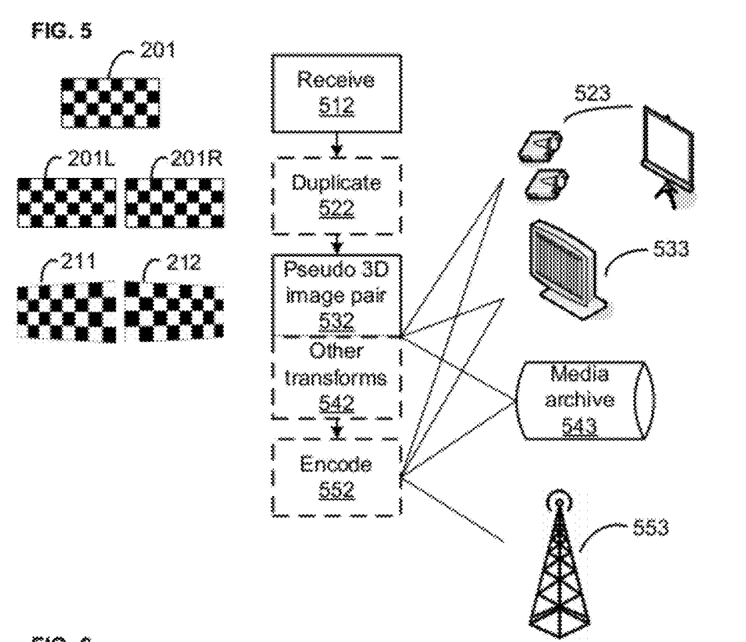
FIG. 5 illustrates the basic creation of pseudo-3D forced perspective image pairs.

One method disclosed involves preparing a pseudo-3D image pair from a 2D image. During the transformation, the 2D image 201 is located 512 in non-transitory memory accessible to a transformation processor. (By "non-transitory," we mean merely to exclude signals in transit on wires.) The 2D image may be in volatile or nonvolatile memory. Volatile memory may be in onboard or offboard memory, may be a memory cell, buffer or register. In nonvolatile memory, it may be in a read-only medium, such as a CD or DVD, or a read/write memory. The read/write memory may be rotating or solid-state. When 2D images are received over a communications channel, they will be received 512 into memory for processing.

This method includes transforming the 2D image using a transformation processor to apply complementary taper functions to generate 532 a left and right forced perspective image pair.

Examples of transformation processors that might be used with this method include a SIMD warp engine processor, a graphics card or processor, an ASIC such as the Pentium processor, a RISC processor, or an FPGA. With appropriate program instructions and processor capabilities, these and similar processors would be capable of applying the complementary taper functions.

In the discussion above, three examples of polygon taper functions are given: keystoning correction, matrix transformations, and general distortion mapping. Applicant explained above that general distortion mapping can be used to apply curvilinear taper functions (FIG. 3C.)

As explained above, a transformation processor generates forced perspective image pair with complementary tapers 211, 213 and, optionally, an offset 365 that spreads the right and left images apart.

Applicant has observed that subjectively pleasing taper functions may exaggerate the difference between left and right images. For instance, if an image plane viewed by a left eye is rotated by 2.2 degrees relative to an image plane viewed by a right eye 814 for a particular scene, it may be subjectively pleasing to impose a forced perspective that is equivalent to an exaggerated 3.0 to 5.0 degree relative rotation 814.

It is worth noting that this method can be performed on a single image, without information from prior or subsequent images. It does not require extraction of objects from the 2D image or calculation of a depth map for the image. While this depth map processing is not required, it is likely that the technology disclosed will be useful in combination with conventional depth mapping generation and conventional 2D-to-3D conversion.

The generation of left and right forced perspective image pairs has utility by itself, regardless of whether the image pairs are stored 543 or used immediately 523, 533, 553 and regardless of whether the image pairs are used directly or encoded 552 to be used in a transmission stream 553. The pseudo-3D forced perspective image pairs could be stored either as output by the transformation processor 532 or after encoding 552 into one or more formats for subsequent transmission 553. In some systems, image pairs could be pipelined through an encoding processor that simultaneously converts the image pair into several different formats. Several immediate uses for pseudo-3D image pairs are discussed above.

According to one aspect of this method, the forced perspective images may have an inside edge 212 that is taller than an outside edge.

A forced perspective parameter 741 may be used with this method to adjust the operation of the transformation processor. The forced perspective parameter would indicate how the complementary taper functions are to be applied. One example of the forced perspective parameter is an angular parameter that expresses rotation 814 about a y-axis of at least one projection plane for the left or right forced perspective image, or both. Suitable values for this parameter are given above. Another example of the forced perspective parameter is a set of coordinates that specify where corners of a 2D image should end up. This is a typical way of thinking of keystone correction: corners ABCD of the 2D image are mapped to corners A'B'C'D' of one image in the pair and a complementary mapping is applied to the other image. The linear algebra for converting corner mapping to matrix parameters is given in some of the publications referenced. In another example, the forced perspective parameter may be a general distortion map. Expressing the forced perspective parameter as an angle or as four corner coordinates is much more compact than the set of polynomial coefficients. In general, a "compact" forced perspective parameter would have nine values or less for transformation of a 2D image into a forced perspective image. An additional nine or fewer values could be supplied for the complementary transformation that generates the second images, or the second set of values could be derived from the first.

The method described may optionally be enhanced by shifting 369 the forced perspective image pair to offset the left image to the left and the right image to the right, as illustrated in FIG. 3F. An offset parameter 365 could be used by the transformation processor to determine the degree of shifting. Preferable ranges of offset parameters are described above.

Producing a pseudo-3D forced perspective image pair typically induces transforming a rectangular image into a trapezoid (trapazium in British English.) Audiences and electronic processing equipment both expect images in a rectangular frame. Accordingly, clipping or zooming and clipping are useful when preparing the forced perspective image pair for display, storage, encoding or transmission.

The image transformation method above, its variations and aspects, can readily be combined with scene adaptation, depicted in FIG. 6, which adjusts the parameters for converting a 2D image into a pseudo-3D image pair. Television programs, movies and other media present a series of scenes. The media is said to "cut" from one scene to another. Scene adaptation combined with transformation involves detecting cuts 622 between scenes, adapting the transformation parameters 632 as appropriate to various scenes, and generating the pseudo-3D image pairs 652 for the scenes using the adapted parameters.

Expressed in more detail, scene adaptation, when combined with the transformation method described above, includes processing the stream of 2D images 612 in memory accessible to a cut detection processor. Successive 2D images on opposite sides of a cut 622 are parts of different scenes. At least once per scene, the scene processor determines and assigns 632 the scene at least one forced perspective parameter. Of course, the scene processor optionally may assign an offset parameter. When the transformation processor transforms 652 a particular 2D image, it uses parameters assigned by the scene processor.

The scene processor may operate automatically or semi automatically. In an automatic processing mode, the same processor determines the forced perspective parameter and optionally determines the offset parameter, without user intervention and at scene changes. In a semi automatic method, the scene processor generates one or more recommended parameters for at least some of the scenes, transmits the recommended parameters, receives a selected parameters message in response, and assigns the parameters to the scene based on the selected parameters message. A semi automatic process may operate automatically for most scenes and make recommendations only for extreme cases, such as macro closeups or reversed forced perspective. Predetermined thresholds may be set to determine normal ranges of distortion, rotation or taper, and to limit recommendations and responses to parameter values that fall outside the thresholds or particular classes of scenes. In general, scene adaptation can be used to set parameters for the 2D image stream without immediately displaying them.

The scene processor may directly assign parameters or it may classify scenes in a way that postpones assignment of parameters. For instance, it may classify the scene by whether the content in the middle part of the frame (say, for instance, the middle third of the frame) is in the foreground or the background. It may classify the scene by how close objects in the foreground are. It may analyze the center of the frame throughout the scene, so that an object appearing in the foreground against a distant background does not change the way the scene is classified.

An alternative use of scene adaptation is a method of determining one or more transformation parameters to control generation of pseudo-3D image pairs from a 2D image stream at a later time or by a remote transformation processor. This method includes receiving 712 a stream of 2D images 201 into memory accessible to the cut detection processor. The cut detection processor detects cuts 722, as described above. The scene processor determines and assigns parameters 732 to scenes within the 2D image stream that specify how a transformation processor will transform 2D images in scenes to generate left and right forced perspective image pairs, pseudo-3D images. The parameters assigned include at least a forced perspective parameter and optionally may include an offset parameter.

As described above, the scene processor may determine scene adaptations automatically or semi automatically.

The results of assigning 742 parameters to scenes could be stored in a table or embedded in the media. For instance, this method may include embedding one or more parameters 741 in image stream control data associated with the 2D image stream. In an MPEG-2 transport stream, user fields would be appropriate. Alternatively, this transport standard could be amended or related standards for images carried by the transport stream could be modified to add parameter fields. The method could include embedding the parameters in image header data for individual images within the 2D image stream, instead of or in addition to parameters in the stream control data. In an image stream that includes both keyframes and difference frames, the parameters preferably would be placed in the headers of at least some of the keyframes. Accordingly, the scene adaptation method has utility regardless of how parameters are correlated with, assigned to or embedded in scenes in the 2D image stream. The scene adaptation method has utility without any need to actually display transformed pseudo-3D images; the transformation (e.g., 536, 652) may be significantly delayed and may be performed by different party or in a different country.

A corollary to scene adaptation for later transformation is a method of receiving 2D images and control information for rendition into pseudo-3D image pairs. This method includes receiving 512 a stream of 2D images including at least one forced perspective parameter. As generally described, the forced perspective parameter specifies how complementary taper functions are to be applied by a transformation processor to transform 2D images in the stream to generate left and right forced perspective image pairs. Optionally, the method further includes using a transformation processor to transform 532 the 2D images upon receipt, responsive to the forced perspective parameter and to generate the left and right forced perspective image pairs.

As described, the forced perspective parameters 741 may change with at least some scene changes in the 2D image stream. The receiving method is extended by generating the pseudo-3D 532 images responsive to the changing parameters.

The method may be further extended by receiving, and then by applying, offset parameters.

The method further may include parsing the data received to retrieve the transformation parameters. In one embodiment, the method involves parsing from image stream control data to find the parameters. In another embodiment, the method involves parsing image headers of at least some image data frames to find the parameters.

For every receiving method, there is a transmitting method. Here, the transmitting method involves transmitting 921 a stream of 2D images 553 including at least one forced perspective parameter 741, wherein the forced perspective parameter specifies how one or more complementary taper functions are to be applied by a transformation processor. The transformation processor behavior is determined by the force perspective parameter that tells the processor how to transform 2D images into left and right forced perspective image pairs.

The transmitting method may be extended by transmitting changing forced perspective parameters.

The transmitting method also may be extended by including one or more offset parameters 365 in the image stream, which also may be changing.

As described above, the transmitting method may embed control information in either image stream control data or headers of at least some image data frames within the image stream.

To recap, particular method embodiments include: a method and variations on the method of preparing a pseudo-3D image pair from a 2D image; a method and variations of generating transformation parameters for scene adaptation; and receiver and transmitter methods that combine forced perspective transformation parameters with 2D image streams.

For each of these methods and variations on these methods, there are corollary devices.

One device disclosed prepares a pseudo-3D image pair from a 2D image. This device includes a memory 1012, a transformation processor 1041, and logic running on the transformation processor. The transformation processor is coupled to the memory. It accesses a 2D image in the memory and applies complementary taper functions to the 2D image to generate a left and right forced perspective image pair.

As described in the context of methods above, the memory may be volatile or nonvolatile, may be on board or offboard the transformation processor, and may be rotating or solid-state. It may variously be characterized as memory, a buffer or register. Examples of transformation processors include the Realta graphics processor, a Nvidia graphics card or processor, an ASIC such as the Pentium processor, a RISC processor, or an FPGA. With appropriate program instructions and processor capabilities, these and similar processors would be appropriate components of the device.

Three examples of taper functions that can be implemented by the logic running on the transformation processor include keystoning correction, general matrix transformations, and general distortion mapping. Again, applicant has explained that general distortion mapping can be used to apply curvilinear taper functions.

In most circumstances, this device produces left and right forced perspective images 211, 213 each having an inside edge 212 and an outside edge, with a taller inside edge than outside edge. This is typical characteristic for complementary transfer functions, though there may be some exceptions, as described above.

This device optionally may have a forced perspective (FP) parameter memory 1012 accessible to the transformation processor. When this parameter memory is available, the transformation processor 1041 applies the complementary taper functions responsive to a value in this memory.

Several types of forced perspective parameter value can be used, including an angular parameter, corner mapping coordinates, or a general distortion map. As described above, an angular parameter expresses rotation about a y-axis 814 of at least one projection plane of the left and/or right forced perspective image. Preferable ranges of angular parameters are described above. The angular parameter may exaggerate the actual parallax between a viewer's eyes. Alternatively, a set of corner mapping coordinates can be supplied, which are algebraically equivalent to eight or nine matrix parameters for a transformation matrix. Most generally, complementary taper functions can be expressed using general distortion maps, as described in some of the referenced patents. Preferably, a compact set of forced perspective parameter values are used, with nine or eight or fewer parameters to describe imposing a forced perspective on a 2D image.

This device further may include an offset parameter memory 1012 accessible to the transformation processor 1041. In this variation, logic running on the transformation processor applies an offset responsive to a value in the offset parameter memory. Preferable ranges for the offset parameter value are described above.

This device further may include logic running on the transformation processor 1041 that clips the pseudo-3D images, zooms the pseudo-3D image or zooms and clips the images.

The 3D images may be clipped to a predetermined aspect ratio.

This device may be extended with a second memory 1012, an input processor 1011, a cut detector 1021 and a scene processor 1031. The input processor is coupled to the second memory. It receives a stream of 2D images 1032 and loads them into the second memory 1012. The cut detection processor 1021 also is coupled to the second memory. It detects cuts in the 2D image stream between scenes. The scene processor 1031 is coupled to the cut detection processor. At least once for each scene, the scene processor determines a forced perspective parameter value applicable to the stream. It sets the forced perspective parameter value or leaves it unchanged, depending on the circumstance. When the transformation device is extended with the scene processor 1031, the transformation processor 1041 repeatedly processes 2D images 1032 using the forced perspective parameter values 1012 assigned by the scene processor.

The scene processor may operate automatically or semi automatically. A semi automatic scene processor is further coupled to an input/output port for communication with the user. In this embodiment, the scene processor generates one or more forced perspective parameter values for at least some of the scenes. It sends the recommended values for transmission via the output port. It receives the selected parameters message via the import port, responsive to the recommendations. It loads the selected force perspective parameter value into the second memory, responsive to the selected parameters message.

As described in the context of the method above, the scene processor operating in a semi automatic mode may further include one or more threshold parameter memories. The scene processor may make recommendations for cases that are outside of threshold parameters. The thresholds may define normal ranges of distortion, rotation or taper and limit use of the recommendation and response protocol to scenes that fall outside of the thresholds.

More generally, the scene processor may determine both a forced perspective parameter value and an offset parameter value. When both values are assigned to their respective parameter memories, the transformation processor uses them to transform 2D images into pseudo-3D image pairs.

The scene processor may operate automatically or semi automatically when generating the offset parameter values, in addition to the forced perspective parameter values.

The scene processor is a useful device, even when not combined with the a local transformation processor. We disclose a device that determines one or more transformation parameters to control a remote transformation processor that generates pseudo-3D image pairs from a 2D image stream. This device includes a memory 1012, an input processor 1021, a cut detection processor 1021, and a scene processor 1031. The input processor receives a stream of 2D images 1032 and loads the 2D images into the memory 1012. The cut detection processor 1021 also is coupled to the memory. It detects cuts in the 2D image stream as scenes change. At least once for each scene, it determines a forced perspective parameter value 1012 that specifies how the remote transformation processor should apply complementary taper functions to transform 2D images in the scene to generate left and right forced perspective image pairs. In either sets this value in memory or leaves it unchanged, depending on the circumstance.

As described above, the scene processor can operate in an automatic or semi automatic mode. The reader should understand that the descriptions above apply again here and need not be repeated.

An image stream processor (not shown) may be coupled to the scene processor to embed the forced perspective parameter values in either image stream control data or in image header data for at least some image data frames. This embedding has been described above.

In addition to determining and setting or leaving unchanged in memory a forced perspective parameter value, the scene processor 1031 may generate an offset parameter value. The offset parameter value specifies the shift of the left image to the left and the right image to the right to be applied by the remote transformation processor. This parameter may be determined automatically or semi automatically. It may be embedded 1032 in an image stream control data or in image header data for at least some image data frames.

A pair of additional devices are receiver and transmitter devices. The receiver device 1101 receives 2D images and control information for rendition of pseudo-3D image pairs. It includes a memory, an input processor 1103, a transformation processor 1105 and logic running on the transformation processor. The input processor receives the stream of 2D images and one or more forced perspective parameter values and loads them into the memory. The forced perspective parameter values specify how the transformation processor will apply complementary taper functions to transform 2D images in the stream to generate left and right forced perspective image pairs. This may change between scenes or may be set for an entire sequence. The logic running on the transformation processor accesses the 2D images in memory and applies the complementary taper functions responsive to the forced perspective parameter values. It generates the pseudo-3D image pairs.

The receiver device may be extended with an input processor 1103 that receives offset parameter values and loads them into the memory. In this variation, the logic running on the transformation processor further applies an image shifter to the 2D images, responsive to the offset parameter values.

As a further aspect, when transformation parameters 741 are carried in image stream control information, the input processor 1103 parses the image stream control information to locate the parameters. Alternatively, when the transformation parameters are carried in image frame header data, the transformation processor 1105 or the input processor 1103 parses the image header to locate the transformation parameter values.

The transmitter device counterpart to the receiver device transmits 2D images and control information for rendition of pseudo-3D image pairs by a remote transformation processor. This device includes a memory and an output processor 1101 coupled to the memory. The output processor transmits a stream of 2D images together with one or more forced perspective parameter values 741. Again, the forced perspective parameter values specify how complementary taper functions should be applied by a remote transformation processor, in order to transform 2D images in the stream and generate left and right forced perspective image appears.

The output processor 1101 of the transmitter device may further transmit one or more offset parameter values together with the 2D image stream.

The transmitter device may be extended with an encoding processor (not illustrated) coupled to the output processor. The encoding processor embeds the forced perspective parameter values either as stream control information in the 2D image stream or as image header data in at least some image frames in the 2D image stream.

In addition to methods and devices, the technology disclosed may be embodied in an article of manufacture, the so-called Beauregard claim. In one embodiment, an article of manufacture (FIG. 12) includes program instructions in non-transitory memory that, when run on one or more processors coupled to memory, carry out any of the methods described in this particular embodiments section or the disclosure that precedes it.

In another embodiment, an article of manufacture (FIG. 12) includes program instructions in non-transitory memory that, when combined with devices having memory and one or more processors, produces any of the specially programmed devices described in this particular embodiments section or the disclosure that precedes it.

The technology disclosed is further described in the claims that follow.

The reader should understand that features and aspects of the methods, devices and articles of manufacture described can be combined in many ways to produce a variety of combinations and sub combinations, all as disclosed inventions.

We claim as follows:

1. A method of preparing a pseudo-3D image pair from a 2D image located in non-transitory memory accessible to a transformation processor, the method including:
    transforming the 2D image using the transformation processor to apply complementary taper functions to generate a left and right forced perspective image pair that have an inside edge that is taller than an outside edge:
    wherein the transforming is responsive to at least one forced perspective parameter used by the transformation processor that indicates how the complementary taper functions are to be applied, wherein the at least one forced perspective parameter comprises an angular parameter that expresses rotation about a y-axis of at least one projection plane for the left or right forced perspective image pair;

receiving a stream of 2D images into a second memory accessible to a cut detection processor;

detecting cuts in the stream using the cut detection processor, wherein successive 2D images represent different scenes;

at least once for each scene, using a scene processor to determine the at least one forced perspective parameter for the scene and assign to the scene at least the determined at least one forced perspective parameter;

repeatedly applying the transforming to generate left and right forced perspective image pairs from the 2D image stream using the forced perspective parameter; and embedding the at least one forced perspective parameter in image stream control data or image header data associated with the 2D image stream.

2. The method of claim 1, wherein the scene processor automatically determines the forced perspective parameter without user intervention at scene changes.

3. The method of claim 1, wherein the scene processor generates one or more recommended forced perspective parameters for at least some of the scenes, transmits the recommended forced perspective parameters, receives a selected parameters message, and assigns the forced perspective parameter responsive to the selected parameters message.

4. A device that prepares a pseudo-3D image pair from a 2D image, the device including:

a memory;

a transformation processor coupled to the memory;

logic running on the transformation processor that accesses a 2D image in the memory and applies complementary taper functions to the 2D image to generate a left and right forced perspective image pair that have an inside edge that is taller than an outside edge;

wherein at least one forced perspective parameter indicates how the complementary taper functions are to be applied by the transformation processor, wherein the at least one forced perspective parameter comprises an angular parameter that expresses rotation about a y-axis of at least one projection plane for the left or right forced perspective image pair;

a second memory;

an input processor coupled to the second memory that receives a stream of 2D images and loads them into the second memory;

a cut detection processor coupled to the second memory that detects cuts in the 2D image stream when successive 2D images on opposite sides of the cuts represent different scenes;

a scene processor coupled to the cut detection processor that, at least once for each scene, determines the at least one forced perspective parameter for the scene and sets or leaves unchanged in the second memory a forced perspective parameter value;

wherein the transformation processor is further coupled to the second memory and the logic running on the transformation processor repeatedly processes the 2D images using the forced perspective parameter values; and logic running on the transformation processor that embeds the at least one forced perspective parameter in image stream control data or image header data associated with the 2D image stream.

5. The device of claim 4, wherein the scene processor automatically determines the forced perspective parameter value, without user intervention at scene cuts.

6. The device of claim 4, further including:

an input/output port for communication with a user, coupled to the scene processor;

wherein the scene processor generates one or more recommended forced perspective parameter values for at least some of the scenes, sends the recommended values for transmission via the output port and receives a selected parameters message via the input port, and loads the selected forced perspective parameter value into the second memory responsive to the selected parameters message.

* * * * *